United States Patent [19]

Kondo et al.

[11] 4,343,273
[45] Aug. 10, 1982

[54] IGNITION SYSTEM WITH OVERRUN PREVENTION

[75] Inventors: Tadasige Kondo; Susumu Ono, both of Tokyo; Kenichi Takata, Musashino, all of Japan

[73] Assignee: Kioritz Corporation, Japan

[21] Appl. No.: 309,155

[22] Filed: Oct. 5, 1981

[30] Foreign Application Priority Data

Oct. 15, 1980 [JP] Japan .................... 55-146867[U]

[51] Int. Cl.³ .............................................. F02B 0/00
[52] U.S. Cl. .................................. 123/335; 123/600; 123/602
[58] Field of Search .................... 123/335, 600, 602

[56] References Cited

U.S. PATENT DOCUMENTS 4,211,195 7/1980 Zechlin ............................. 123/335
4,252,095 2/1981 Jaucmes ............................ 123/335
4,297,977 11/1981 Boyama ............................ 123/335

Primary Examiner—Ronald B. Cox
Attorney, Agent, or Firm—Karl W. Flocks and Associates

[57] ABSTRACT

An ignition system of the capacitor discharge type and capable of preventing overrunning of an internal combustion engine includes a control circuit to render a switching transistor connected to a gate-cathode circuit of a main thyristor conductive for a predetermined period of time to interrupt a backward or reverse phase voltage generated by a magneto and serving as an ignition signal for the main thyristor from being applied thereto. The control circuit includes an integrator circuit connected in parallel with a constant voltage source to develop a voltage increasing with time and includes a voltage divider of the constant voltage source to provide a reference voltage. A transistor circuit of the control circuit compares the output voltage of the integrator circuit and the output voltage of the voltage divider and the transistor circuit maintains a control signal to be applied to the transistor circuit until the output of the integrator circuit reaches the reference voltage of the divider. The period of time during which the control signal is applied to the switching circuit to maintain the switching circuit being conductive is precisely constant irrespective of a variation in rotational speed of the engine. When the rotational speed of the engine increases and exceeds a normal rotational speed region, the occurrence of the ignition signal or the backward voltage of the magneto becomes early to cause the leading portion of the ignition signal to overlap with the end portion of the predetermined period of time resulting in retardation of the ignition timing and preventing overrunning of the engine.

5 Claims, 6 Drawing Figures

IGNITION SYSTEM WITH OVERRUN PREVENTION

BACKGROUND OF THE INVENTION

1. Field of the Invention

The present invention relates to a capacitor discharge type ignition system for an internal combustion engine, and more particularly an ignition system with overrun prevention capability to prevent the overrun of the engine by retarding an ignition timing.

2. Description of the Prior Art

An ignition system having an ignition angle retarding circuit to prevent the overrun of the engine has been known by, for example, Japanese Published Unexamined Patent Application No. 55-5451. In the known ignition system, an auxiliary capacitor is charged in parallel with the charging of a main capacitor (or a charging capacitor) and discharged through a discharging circuit connected to a base of a switching transistor which is connected in parallel with a gate-cathode circuit of a main thyristor (or an ignition control thyristor) so that the switching transistor is rendered conductive for only a predetermined time period. When an ignition signal overlaps with the predetermined conduction time period of the switching transistor as the rotational speed of a reverse electromotive force of a generator coil serving as the ignition signal, the ignition timing is delayed by the overlapped period. In this case, it is important to maintain the constant conduction period independently of the rotational speed of the engine. To this end, design and manufacture approaches to keep constant a peak value of the charge voltage of the auxiliary capacitor, a capacitance of the auxiliary capacitor and a resistance of the discharging path for the auxiliary capacitor have been devised but they have not been satisfactory.

SUMMARY OF THE INVENTION

It is an object of the present invention to provide an ignition system which is an improvement over the prior art ignition system with overrun prevention capability, is less affected by variance in performance of a magneto and other components which are mass-produced, is free from variation of an engine rotational speed at which the retardation of the ignition timing begins and provides a sufficient amount of retardation angle.

In accordance with the present invention, in order to assure that the angle retardation always begins at the predetermined engine rotational speed in an overrunning region independently of the variance of performance of the components, the conduction period of the switching transistor of the switching circuit which prevents the ignition signal from being applied to the gate-cathode circuit of the main thyristor always pertains for a constant time interval from a predetermined reference time point independently of the rotational speed of the engine. To this end, a control circuit for controlling the conduction period of the switching transistor comprises an integration circuit which is fed from a constant voltage supply which is established by a constant voltage circuit including a Zener diode to produce an output voltage which increases with time in accordance with the applied constant voltage, and a pair of transistors which compares the output voltage of the integration circuit with a voltage of a voltage divider which produces a constant voltage determined by the applied constant voltage so that each of the transistors conducts during a time period in which one of the voltages is larger than the other. Since both the output voltages of the integration circuit and the voltage divider are proportional to the applied constant voltage, the affect by the variation of the applied constant voltage due to the variance in the absolute value of the Zener voltage of the Zener diode is eliminated. The bases of the pair of transistors are connected to the output terminals of the integration circuit and the voltage divider, respectively, which are parallel to the constant voltage circuit, and the transistors are connected in parallel with the constant voltage circuit through a common emitter resistor and separate collector resistors. The transistor having its base connected to the output terminal of the voltage divider is first turned on, and as the output voltage of the integration circuit exceeds the output voltage of the voltage divider after a certain time period, the other transistor is turned on to flip the on-off condition. In response thereto, the switching transistor of the switching circuit conducts upon the turn-on of the one transistor of the control circuit and the conduction period terminates upon the turn-on of the other transistor. The conduction period is therefore constant independently of the rotational speed of the engine. The ignition signal to trigger the main thyristor is a backward component of an electromotive force generated by the generator coil of the magneto. It is generated in synchronism with the rotation of the engine. In a normal rotation region of the engine, it is generated after the termination of the conduction period of the switching circuit, but in an overrunning region the period of the ignition signal is shorted so that a leading edge of the ignition signal overlaps a trailing edge of the conduction period of the switching circuit. The overlapped portion of the ignition signal is not applied to the gate-cathode circuit of the main thyristor. Accordingly, the ignition timing is lagged by the time interval or crank angle corresponding to the overlapped period so that the engine output is reduced and the rotational speed is reduced.

DESCRIPTION OF THE PREFERRED EMBODIMENTS

Figure 1:
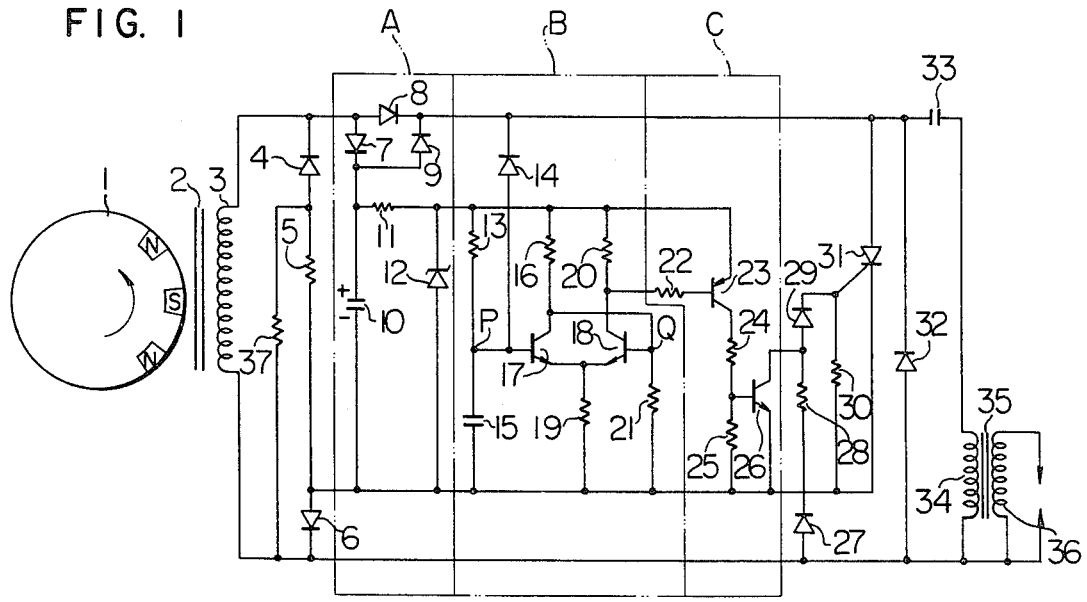
FIG. 1 shows a circuit diagram of a first embodiment of the present invention.

The preferred embodiments of the present invention will now be explained with reference to the accompanying drawings. FIG. 1 shows a first embodiment which is similar to a conventional capacitor discharge type ignition system except circuit sections A, B and C (to be described later). It includes a magneto 1, 2, 3, a main capacitor 33, a main thyristor 31 and an ignition coil 34, 35, 36. The magneto comprises a rotor 1, a core 2 and a generator coil 3. The main capacitor 33 is charged by a forward electromotive force generated by the generator coil 3 and a backward electromotive force is used as an ignition signal source to trigger the main thyristor 31. A charge in the main capacitor 33 is discharged through the main thyristor 31 and the primary winding 34 of the ignition coil to induce a high voltage in the secondary winding 35.

A circuit section for preventing the overrun comprises a constant voltage circuit A for supplying a constant voltage source for the operation of the circuit section, a control circuit B for generating a control signal to render the switching transistor conductive for a predetermined time period from a preset time point, and a switching circuit C which conducts only for a predetermined time period independently of the rotational speed of the engine to bypass the portion of the ignition signal which overlaps the conduction period in order to prevent the overlapped portion from being applied to the gate-cathode circuit of the main thyristor. The constant voltage circuit A comprises an auxiliary capacitor 10 which is charged parallelly with the main capacitor 33 and a Zener diode 12 connected in parallel therewith through a resistor 11. A constant voltage is produced across the Zener diode 12. The control circuit B comprises an integration circuit including a resistor 13 and a capacitor 15 and a voltage divider including a pair of resistors 16 and 21, connected in parallel with the Zener diode 12, respectively, and a pair of transistors 17 and 18. Bases of the transistors 17 and 18 are connected to output terminals P and Q of the integration circuit and the voltage divider, respectively, and emitters of the transistors 17 and 18 are connected to a common resistor 19. One of the voltages appearing at the output terminals P and Q increases with time while the other is a constant reference voltage. Both voltages are proportional to the constant voltage applied from the constant voltage circuit. Since those voltages are compared with each other, any variance in the absolute value of the Zener voltage of the Zener diode 12 is permissible. The transistor 18 is turned on while the voltage at the terminal Q of the voltage divider is larger than the voltage at the terminal P of the integration circuit, and the transistor 17 is turned on and the transistor 18 is turned off when the voltage at the terminal P of the integration circuit is larger. The switching circuit C includes a switching transistor 26 connected to a gate circuit of the main thyristor 31 and a transistor 23 for driving the switching transistor 26. When the transistor 18 of the control circuit B is on, the switching transistor 26 is turned on through the driving transistor 23, and when the transistor 17 is turned on the switching transistor 26 is turned off.

Figure 2:
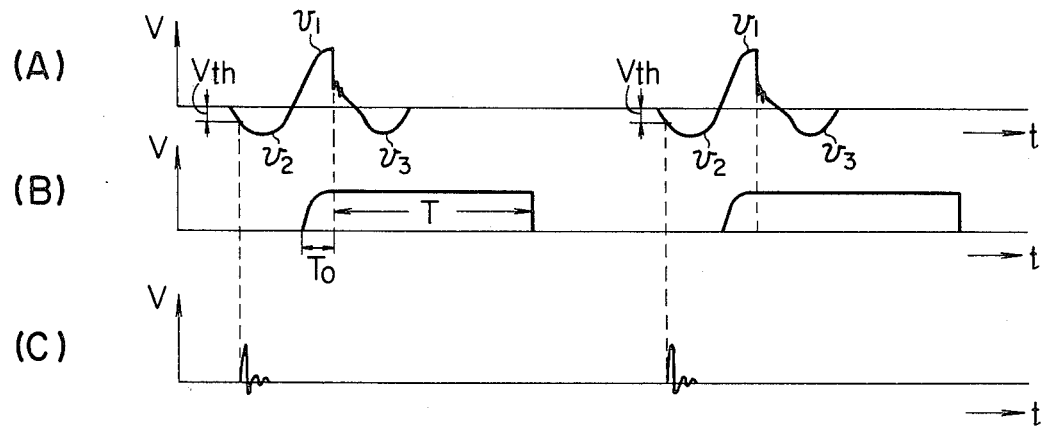
FIGS. 2 and 3 show signal waveforms at various points for explaining the operation of the first embodiment.

Referring to FIGS. 1 and 2, the operation is now explained. The rotor 1 of the magneto has two or three pole pieces, N, S, N as is conventional so that a forward electromotive force (or voltage) $V_1$ is generated in the generator coil 3 and backward electromotive forces (or voltages) $V_2$ and $V_3$ are generated before and after $V_1$ in each cycle of the engine rotation, as shown in (A) in FIG. 2. The backward electromotive force $V_2$ which is generated immediately before the forward electromotive force $V_1$ is used as the ignition signal source of the main thyristor 31. The main capacitor 33 is charged by the forward electromotive force $V_1$ through the diode 8 while the auxiliary capacitor 10 of the constant voltage circuit A is charged through the diode 7 which branches from the anode of the diode 8. The charge stored in the auxiliary capacitor 10 discharges through the resistor 11 and the Zener diode 12 so that a constant voltage is developed across the Zener diode 12. In the integration circuit 13, 15 to which the constant voltage (Zener voltage) is applied, the capacitor 15 is charged through the resistor 13 with a predetermined time constant so that the voltage at the output terminal P or the base voltage of the transistor 17 rises gradually. On the other hand, the voltage at the output terminal Q of the voltage divider 16, 21 or the base voltage of the transistor 18 is fixed to a constant voltage which is devised by dividing the Zener voltage of the Zener diode 12 by the resistors 16 and 21.

First, the voltage at the terminal P is higher than that at the terminal Q and a current flows in the base of the transistor 18 to turn it on. As a result the transistor 17 is turned off and no current flows in the base. As the transistor 18 conducts, a current flows through the resistor 20 connected to the collector to produce a potential difference across the resistor 20. Since the base of the driving transistor (PNP) 23 is connected to the junction of the collector of the transistor 18 and the resistor 20 through the resistor 22 and the emitter is connected to the other terminal of the resistor 20, a current flows into the base of the transistor 23 due to the potential difference across the resistor 20 to turn on the transistor 23. A current flows through the emitter-collector circuit of the transistor 23 and the resistors 24 and 25 connected in series therewith and a current flows into the base of the switching transistor 26 having its base connected to the junction of the resistors 24 and 25, through the transistor 23 and the resistor 24 to turn on the transistor 26.

The backward electromotive force of the generator coil 3 which serves as the ignition signal to trigger the main thyristor 31 flows into the gate-cathode circuit of the main thyristor 31 through the diode 27, the resistor 28 and the diode 29 which are connected between the generator coil 3 and the gate of the main thyristor 31. Since the collector emitter circuit of the switching transistor 26 is connected to the junction of the resistor 28 and the diode 27 and the cathode of the main thyristor 31, if the switching transistor 26 is on at the time when the ignition signal is applied, the ignition signal is bypassed through the resistor 28 and the collector-emitter circuit of the switching transistor 26 so that it returns to the generator coil 3 through the resistor 5 and the diode 4. As a result, the ignition signal is prevented from being applied to the gate-cathode circuit of the main thyristor 31 and hence the main thyristor 31 is not triggered.

As the capacitor 15 of the integration circuit is charged up to raise the voltage at the terminal P so that it exceeds the voltage at the terminal Q of the voltage divider, a current flows into the base of the transistor 17 to turn it on and turn off the transistor 18. Since the base of the transistor 18 is directly connected to the collector of the transistor 17 and the resistor 16 of the voltage divider is connected between the collector of the transistor 17 and the cathode of the Zener diode 12, the base voltage of the transistor 18 further drops when the transistor 17 is turned on and a current flows through the resistor 16 to insure positive flipping of the on and off conditions of the transistors 17 and 18. As the transistor 18 is turned off, the potential difference across the resistor 20 disappears so that no base current flows in the driving transistor 23 resulting in the turn-off of the transistor 23. As the transistor 23 is turned off, no base current flows in the switching transistor 26 and the conduction of the transistor 26 is terminated.

FIG. 2 in (B) shows a waveform of the base-emitter voltage of the switching transistor 26 to illustrate the conduction period of the transistor 26. A period $T_o$ of the conduction period indicates a time period from the start of the discharge current from the auxiliary capacitor 10 to the resistor 25 connected between the base and the emitter of the switching transistor 26 through the transistor 23 and the resistor 24 as a result of the turn-on of the transistor 18 and the resulting turn-on the transistor 23, to the time when the forward electromotive force $v_1$ shown in (A) in FIG. 2 reaches the peak value (which substantially corresponds to the time when the charging of the main capacitor 33 completes). This time period $T_o$ varies with the rotational speed of the engine. However, a time period T following to the time period $T_o$ is a fixed period which is independent from the rotational speed of the engine, as described above.

When the rotational speed of the engine is in a normal rotational speed region, the first backward electromotive force $v_2$ in the next sequential cycle which serves as the ignition signal is generated after the termination of the conduction period ($T_o$+T) of the switching transistor 26 as shown in (A) and (B) in FIG. 2. Accordingly, the backward electromotive force $v_2$ is applied to the gate-cathode circuit of the main thyristor 31, and when it reaches a trigger voltage Vth the main thyristor 31 is triggered so that a high secondary voltage as shown in (C) in FIG. 2 is induced in the secondary winding 36 of the ignition coil. As the main thyristor 31 conducts, the charge in the auxiliary capacitor 10 of the constant voltage circuit A is discharged through the diode 9 and the main thyristor 31 to be ready for the charging in the next cycle.

Figure 3:
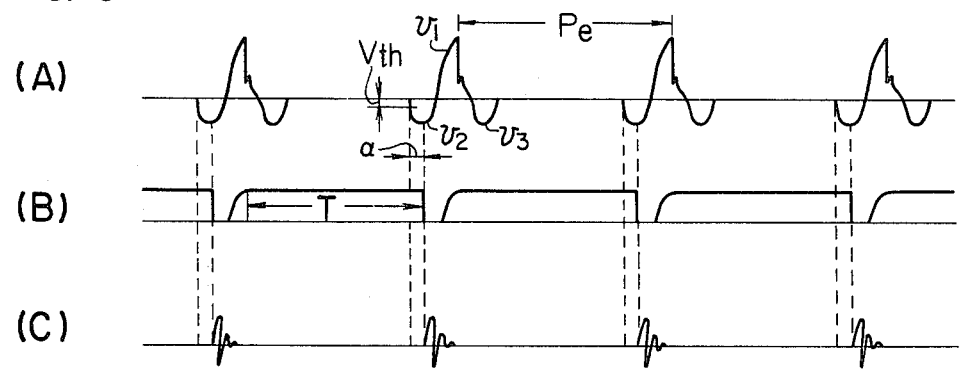

As the rotational speed of the engine increases beyond the normal rotational speed region, a period Pe of the electromotive force generated in the generator coil 3 is gradually shortened. In an overrunning region, a trailing edge of the conduction period of the switching transistor 26 overlaps a leading edge of the backward electromotive force $V_2$ of the next cycle which serves as the ignition signal source, as shown in (A) and (B) in FIG. 3 (because the conduction period T is constant independently of the rotational speed). Since the ignition signal is not applied to the gate-cathode of the main thyristor 31 during the overlapping period $\alpha$ but applied after the termination of the overlapping period, the ignition timing is delayed or retarded by the overlapping period $\alpha$. It should be noted that an effective duration of the ignition signal (a duration during which $V_2$ is larger than the trigger voltage Vth) must be longer than the desired retardation angle $\alpha$.

Figure 4:
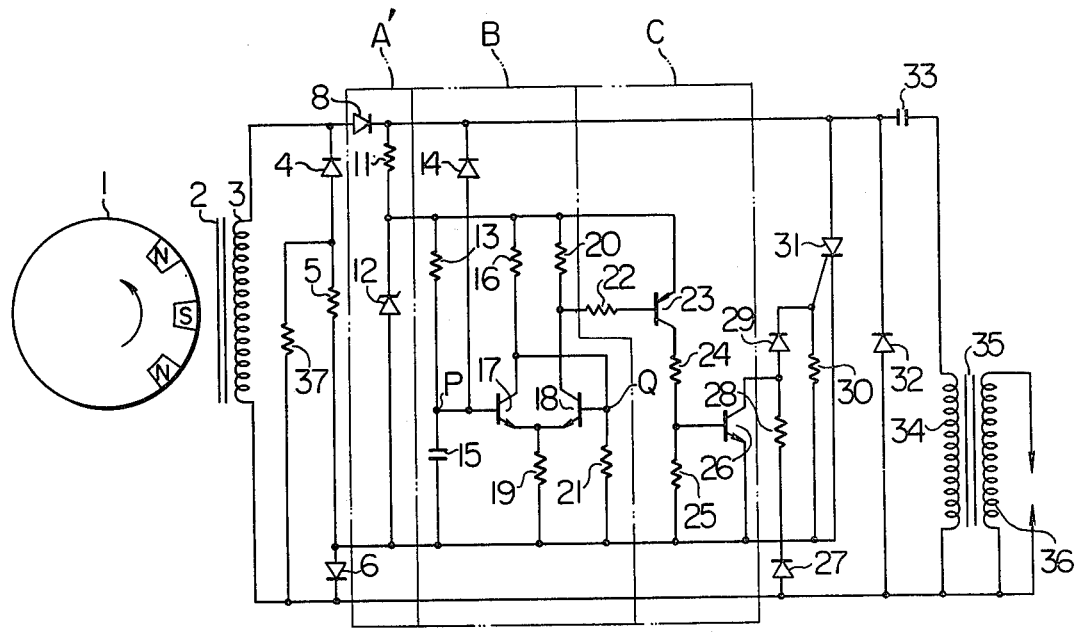
FIG. 4 shows a circuit diagram of a second embodiment.

FIG. 4 shows a circuit diagram of a second embodiment. It differs from the first embodiment of FIG. 1 only in a constant voltage circuit A' of the control circuit. In the present embodiment, no separate auxiliary capacitor 10 in FIG. 1 is provided but the main capacitor 33 carries out the function of the auxiliary capacitor 10 in FIG. 1. A portion of charge stored in the main capacitor 33 is discharged through the resistor 11 and the Zener diode 12 so that a constant voltage is developed across the Zener diode 12 as is done in FIG. 1. Because the auxiliary capacitor 10 is eliminated, the diodes 7 and 9 (FIG. 1) which form the charging and discharging paths of the auxiliary capacitor 10 are not necessary. In the present embodiment, when the rotational speed of the engine is low and the electromotive force of the magneto has a sufficient margin, a simpler circuit than that of FIG. 1 may be used to attain the same effect.

Figure 5:
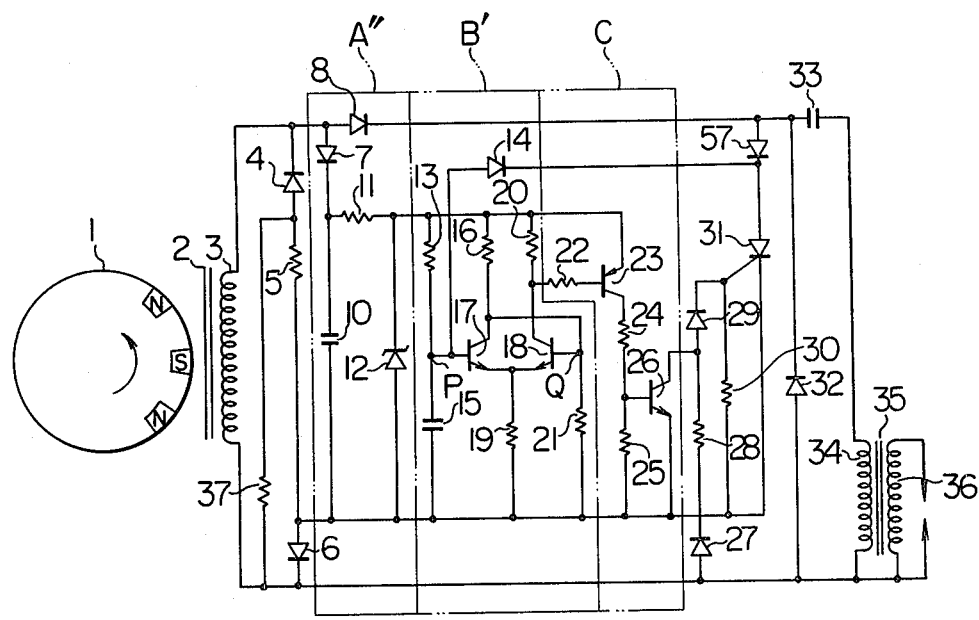
FIG. 5 shows a circuit diagram of a third embodiment.

FIG. 5 shows a circuit diagram of a third embodiment which attains a larger retardation rate than that of the first embodiment shown in FIG. 1. It differs from FIG. 1 in that the diode 9 which forms the discharging path for discharging the charge in the auxiliary capacitor 10 of the constant voltage circuit A of the control circuit (A, B, C) when the main thyristor 31 conducts is eliminated, and the cathode of the diode 14 which forms the discharging path of the capacitor 15 of the integration circuit B' is connected to a cathode of a diode 57 which is connected in series with the main thyristor 31 between the main thyristor 31 and the main capacitor 33. As a result, the charge in the auxiliary capacitor 10 of the constant voltage circuit A'' is not discharged when the main thyristor 31 conducts but remains until the next cycle. As a result, when the charge in the capacitor 15 of the integration circuit B' discharges through the diode 14 and the main thyristor 31 by the conduction of the main thyristor 31 and then the ignition operation completes and the main thyristor 31 is turned off, the auxiliary capacitor 10 immediately starts to charge up the capacitor 15. Since the voltage at the terminal Q of the voltage divider also remains unchanged, the ignition prevention signal (i.e. the conduction of the switching transistor 26) starts to rise simultaneously. The diode 57 functions to prevent the current to flow into the capacitor 15 through the resistor 13 from flowing into the main capacitor 33.

Figure 6:
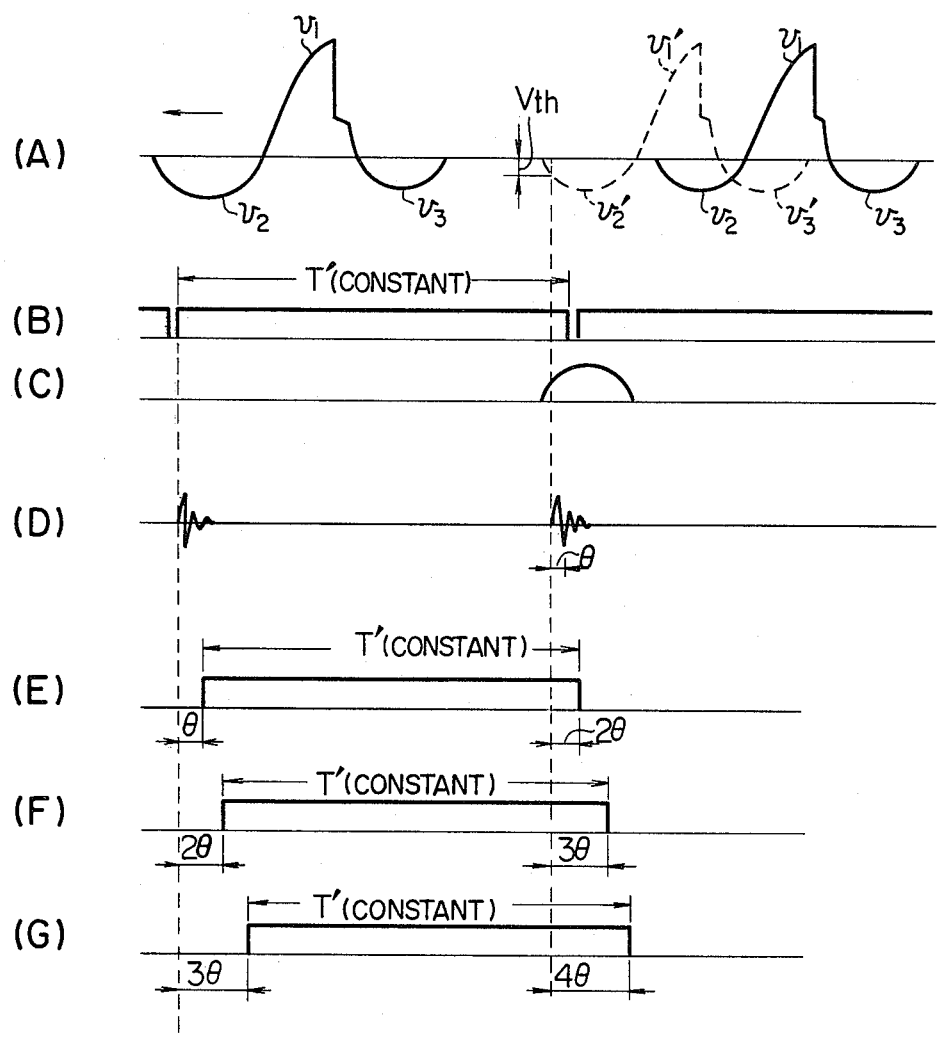
FIG. 6 shows signal waveforms at various points for explaining the operation of the third embodiment.

Referring to FIG. 6, the manner of the retardation of the ignition angle is explained. In the normal rotational speed of the engine, the operation is the same as that of the first embodiment shown in FIG. 1, but when the rotational speed of the engine reaches the overrunning region or exceeds the predetermined retardation starting rotational speed, the period of the electromotive force generated in the generator coil 3 is shortened so that the electromotive force assumes a broken line waveform shown in (A) in FIG. 6. (A solid line shows a position in the normal rotational speed). FIG. 6 in (B) shows the conduction period T' of the switching transistor 26. The time period T' is constant independently of the rotational speed of the engine and starts immediately after the conduction period of the main thyristor 31 or the ignition operation. In a first cycle, the ignition angle is retarded by a period $\theta$ during which the trailing edge of the constant conduction period T' of the switching transistor 26 shown in (B) in FIG. 6 overlaps the leading edge of the ignition signal (the electromotive force $V_2'$ shown in (A) in FIG. 6 is shown in (C) in FIG. 6 with its phase reversed) and the high voltage is induced in the secondary winding 36 of the ignition coil as shown in (D) in FIG. 6 to carry out the ignition operation. The angle retardation in a second cycle is $2\theta$ because the constant conduction period T' in the second cycle starts after the angle retardation of $\theta$ in the previous cycle as shown in (E) in FIG. 6. (Strictly speaking, the conduction period of the main thyristor 31 exists after the angle retardation of $\theta$ but it may be neglected because it is shorter than the period T'.) In third and fourth cycles, an angle of $\theta$ is retarded, respectively, in addition to the angle retardation in the previous cycle so that the angle is retarded by $3\theta$ and $4\theta$, respectively. In this manner, as the engine cycle is repeated, the retardation rate increases and is more rapidly accelerated. As a result, the rise of the engine rotational speed is prevented at a rotational speed which is very close to the retardation start rotational speed. In this case, however, it is necessary that the effective duration of the ignition signal $V_2'$ (that is, the time period during which the signal is larger than the threshold value Vth) be sufficiently long.

As described hereinabove, according to the present invention, since the angle retardation starts as soon as the engine rotational speed reaches the predetermined rotational speed (retardation-start-rotational-speed) independently of the variance in the performance of the mass-produced components to prevent the engine rotational speed from entering the overrunning region, the constant conduction period of the switching transistor 26 does not vary. The factors which relate to the stability of the constant conduction period are the variance in the charge voltage of the auxiliary capacitor 10, that is, the variances in the magnetic force of the rotor 1 of the magneto, a gap between the rotor 1 and the core 2 and the characteristic of the generator coil 3, and the variance in the capacitance of the auxiliary capacitor 10. Another factor is the exact and positive control of the on-off timing of the driving transistor 23 for the switching transistor 26. For those factors, in accordance with the present invention, the constant voltage circuit including the Zener diode 12 is used and the pair of transistors 17 and 18 which are complementarily turned on and off and the integration circuit and the voltage divider for controlling the transistors are used in order to compensate for the variance in the characteristic of the Zener diode 12 and control the turn-on and turn-off of the switching transistor 26 and control the driving transistor 23. Accordingly, the stable, retardation-start-rotational-speed is obtained without the affect of the electromotive force of the magneto and independently of the variance in the characteristics of the components.

We claim:

1. An ignition system capable of preventing an overrun of an engine in which a main capacitor is charged by one component of an electromotive force of a magneto and the charge stored in said main capacitor is discharged through a primary winding of an ignition coil by triggering a main thyristor by an ignition signal derived from the other component of said electromotive force to induce a high voltage necessary to ignite an engine across a secondary winding of said ignition coil, said ignition system comprising;

a switching circuit connected to a gate circuit of said main thyristor and having a switching transistor for preventing said ignition signal from being applied to a gate of said main thyristor, a transistor for driving said switching transistor and a series circuit of a pair of resistors, the junction of said pair of resistors being connected to a base of said switching transistor, a constant voltage circuit connected in parallel with a generator coil of said magneto, and a control circuit for actuating said switching circuit for a predetermined time period from a predetermined time point, said control circuit including an integration circuit connected in parallel with said constant voltage circuit and having a series circuit of a resistor and a capacitor, a pair of first and second transistors each connected in parallel with said integration circuit and a voltage divider connected in parallel with said integration circuit and having a pair of series-connected resistors, a collector of said first transistor being connected to one end of said integration circuit through one of said pair of resistors of said voltage divider, a collector of said second transistor being connected to said one end of said integration circuit through a resistor, emitters of said first and second transistors being connected to the other end of said integration circuit through a common resistor, a base of said first transistor being connected to the junction of said resistor and said capacitor of said integration circuit, a base of said second transistor being connected to said collector of said first transistor and to the junction of said pair of resistors of said voltage divider, a base of said driving transistor for said switching transistor being connected to said collector of said second transistor through a resistor, whereby when a rotational speed of said engine exceeds a normal rotational speed region and enters an overrunning region to shorten a period of said ignition signal so that said ignition signal partially overlaps the constant conduction period of said switching circuit, an ignition timing is retarded by a crank angle of said engine corresponding to the overlapping period to reduce the rotational speed of said engine.

2. An ignition system according to claim 1 wherein wherein said constant voltage circuit includes an auxiliary capacitor connected in parallel with said generator coil of said magneto through a diode polarized such that said auxiliary capacitor is charged in parallel with said main capacitor by said one component of said electromotive force generated by said magneto, said diode branching from an anode of a diode forming a charging path for said main capacitor, and a Zener diode connected in parallel with said auxiliary capacitor.

3. An ignition system according to claim 1 wherein said constant voltage circuit includes a series circuit of a resistor and a Zener diode connected in parallel with said generator coil of said magneto.

4. An ignition system according to claim 2 wherein said constant voltage circuit includes a diode for forming a discharging path for said auxiliary capacitor, said diode being connected between the junction of said auxiliary capacitor and said diode forming a charging path for said auxiliary capacitor and a cathode of said diode forming the charging path for said main capacitor.

5. An ignition system according to any one of claims 1, 2, 3 and 4 wherein said control circuit includes a diode connected between the junction of said resistor and said capacitor of said integration circuit and an anode of said main thyristor, whereby a charge stored in said capacitor of said integration circuit is discharged through said main thyristor.

* * * * *